(12) United States Patent
Oron et al.

(10) Patent No.: US 7,924,847 B1
(45) Date of Patent: *Apr. 12, 2011

(54) METHOD AND SYSTEM FOR VIRTUAL CIRCUIT NUMBERING

(75) Inventors: Moshe Oron, San Rafael, CA (US); Paul Warner, Hollywood, FL (US); Shimon Hochbaum, Santa Rosa, CA (US)

(73) Assignee: Tellabs Petaluma, Inc., Naperville, IL (US)

( * ) Notice: Subject to any disclaimer, the term of this patent is extended or adjusted under 35 U.S.C. 154(b) by 200 days.

This patent is subject to a terminal disclaimer.

(21) Appl. No.: 12/321,592

(22) Filed: Jan. 21, 2009

Related U.S. Application Data

(63) Continuation of application No. 10/767,218, filed on Jan. 28, 2004, now Pat. No. 7,489,692.

(51) Int. Cl.
*H04L 12/26* (2006.01)

(52) U.S. Cl. .................................. 370/395.43; 370/409
(58) Field of Classification Search .................. 370/397, 370/399, 395.43, 409
See application file for complete search history.

(56) References Cited

U.S. PATENT DOCUMENTS

| | | |
|---|---|---|
| 5,912,892 A | 6/1999 | Barnhart et al. |
| 2004/0177107 A1* | 9/2004 | Qing et al. ................. 709/200 |
| 2005/0008372 A1 | 1/2005 | Hochbuam |

* cited by examiner

*Primary Examiner* — Melvin Marcelo
(74) *Attorney, Agent, or Firm* — Hamilton, Brook, Smith & Reynolds, P.C.

(57) ABSTRACT

A system and method for providing identifying numbers for virtual circuits and virtual paths in a network is described. The system and method make use of a predetermined group of identifying numbers such that each number corresponds to a particular communication type and port.

22 Claims, 4 Drawing Sheets

| PORT TYPE | | PORT # | PER PORT VCC # | FORMULA | VCI VALUE |
|---|---|---|---|---|---|
| DATA PORT ETHERNET / DSL | | 1 - 24 | 1st | 31 + PORT # | 32 - 55 |
| | | 1 - 24 | 2nd | 55 + PORT # | 56 - 79 |
| | | 1 - 24 | 3rd | 79 + PORT # | 80 - 103 |
| | | 1 - 24 | 4th | 103 + PORT # | 104 - 127 |
| | | 1 - 24 | 5th | 127 + PORT # | 128 - 151 |
| | | 1 - 24 | 6th | 151 + PORT # | 152 - 175 |
| | | 1 - 24 | 7th | 175 + PORT # | 176 - 199 |
| | | 1 - 24 | 8th | 199 + PORT # | 200 - 223 |
| VOICE | SINGLE VCC | 1 | 1 | 256 | 256 |
| | PER PORT VCC | 1 - 32 | 1 | 255 + PORT # | 256 - 287 |
| T1 | | 1 - 8 | 1 | 311 + PORT # | 312 - 319 |
| CONTROL PORT (OMCI) | | 1 | 1 | 512 | 512 |

| Bit | Field |
|---|---|
| 0-7 | PORT / VCC INSTANCE |
| 8-10 | PORT TYPE |
| 11-15 | UNUSED |

PORT TYPE values:

| | | | |
|---|---|---|---|
| 0 | 0 | 0 | 0 DATA PORTS: ETHERNET / DSL |
| 0 | 0 | 1 | 1 TDM PORTS: VOICE / T1 / DS3 |
| 0 | 1 | 0 | 2 OAM "PORTS": OMCI / DIAGNOSTICS |
| 1 | 0 | 0 | 4 FUTURE PORTS |

FIG. 3

| PORT TYPE | | PORT # | PER PORT VCC # | FORMULA | VCI VALUE |
|---|---|---|---|---|---|
| DATA PORT ETHERNET / DSL | | 1-24 | 1st | 31 + PORT # | 32 - 55 |
| | | 1-24 | 2nd | 55 + PORT # | 56 - 79 |
| | | 1-24 | 3rd | 79 + PORT # | 80 - 103 |
| | | 1-24 | 4th | 103 + PORT # | 104 - 127 |
| | | 1-24 | 5th | 127 + PORT # | 128 - 151 |
| | | 1-24 | 6th | 151 + PORT # | 152 - 175 |
| | | 1-24 | 7th | 175 + PORT # | 176 - 199 |
| | | 1-24 | 8th | 199 + PORT # | 200 - 223 |
| VOICE | SINGLE VCC | 1 | 1 | 256 | 256 |
| | PER PORT VCC | 1-32 | 1 | 255 + PORT # | 256 - 287 |
| | T1 | 1-8 | 1 | 311 + PORT # | 312 - 319 |
| CONTROL PORT (OMCI) | | 1 | 1 | 512 | 512 |

FIG. 4

METHOD AND SYSTEM FOR VIRTUAL CIRCUIT NUMBERING

RELATED APPLICATION

This application is a continuation of U.S. application Ser. No. 10/767,218, filed Jan. 28, 2004 now U.S. Pat. No. 7,489,692. The entire teachings of the above application are incorporated herein by reference.

FIELD OF INVENTION

The present invention relates generally to the field of optical networking.

DESCRIPTION OF THE RELATED ART

In order to serve the increasing bandwidth requirements demanded by modern communication applications, high-speed communications networks have been developed. The advent of certain technological advances, the movement from centralized systems to distributed computing, and worldwide standardization efforts, among other things, have led to the availability of high performance digital communications networks.

One such network is defined by a group of standards referred to as Asynchronous Transfer Mode (ATM). ATM technology and protocols allow for the integrated transmission of voice, data and video traffic simultaneously over high bandwidth circuits at speeds from T1 to OC-48 (2.5 Gbps). Communication using ATM is accomplished through the switching and routing of packets of data referred to as cells, and a cell is a fixed-size packet of data. ATM networks are often used to provide high speed Internet access.

One particular type of ATM network makes use of optical waveguides in place of electrical conductors to carry the signals. Though most optical networks switch to electrical conductor transmission at the termination points, it would be beneficial from both a speed and a bandwidth perspective to provide entirely optical networks. While optical networks have become common in long-haul and metro area networking, they have not yet fully penetrated the local access portion of the network architecture. A particular example of a more local network is the PON (Passive Optical Networking) network. In this regard, the industry is working on the problems of providing so-called fiber to the premises (FTTP) networks. FTTP networks, and in particular, point to multipoint FTTP networks are generally quite complex and the standards governing them require a number of addressing rules to be applied by service providers that install and maintain them. Thus, the inventors have determined that an automated system of handling numbering for ATM interfaces can find use in current and upcoming generations of optical networks.

SUMMARY

Embodiments may include a method that includes determining a communication port number corresponding to a particular communication port, determining a communication type corresponding to the communication port and selecting an identifying number that corresponds to the port and type. The identifying number includes particular bits that correspond to the port and other bits that correspond to the type.

Additional embodiments adhere to numbering rules set forth in standards governing ATM networks. Further additional embodiments make use of a system in which a group of low bits correspond to the port and a group of high bits correspond to the type.

Embodiments may also include a system that includes an communication network having a plurality of communication ports and allowing for a plurality of communication types, a network controller, functionally associated with the network, that makes use of identifying numbers associated with the plurality of communication ports and the plurality of communication types, and a processor, configured and arranged to select an identifying number for at least one of the plurality of communication ports or at least one of the plurality of communication types.

Furthermore, embodiments may include a machine readable medium encoded with machine executable instructions for performing a method including determining a communication port number corresponding to a particular communication port, determining a communication type corresponding to the communication port and selecting an identifying number that corresponds to the port and type.

BRIEF DESCRIPTION OF THE DRAWINGS

The invention claimed and/or described herein is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 3 shows a table illustrating an example of another numbering scheme; and

FIG. 4 shows a table illustrating an example of a further numbering scheme.

DETAILED DESCRIPTION

An embodiment of the present invention includes a system and method for providing network addressing using predetermined rule sets for use with a communications service. It may find particular application in optical networks, and in particular, point to multipoint networks including PONs, broadband PONs (BPONs) and gigabit PONs (GPONs).

In at least one embodiment, one such communications service may be an ATM based network that provides data services such as Internet Access to multiple subscribers.

Service providers may provide differentiated communications services to their users by providing ATM services in accordance with a particular ATM service category for different applications. For example, high speed Internet access may be provided in accordance with the Unspecified Bit Rate ("UBR") ATM service category. The UBR service category is intended for non-real-time applications (i.e., applications that can tolerate relatively high variations in cell transfer delay) and does not guarantee any particular CLR or CRD for the ATM service. Other types of service include continuous bit rate (CBR) service, non-real time variable bit rate (nrt-VBR) and real time variable bit rate (rt-VBR) service. The various service categories discussed herein may also be referred to as service types and other service types are contemplated as being within the scope of the invention.

Figure 1:
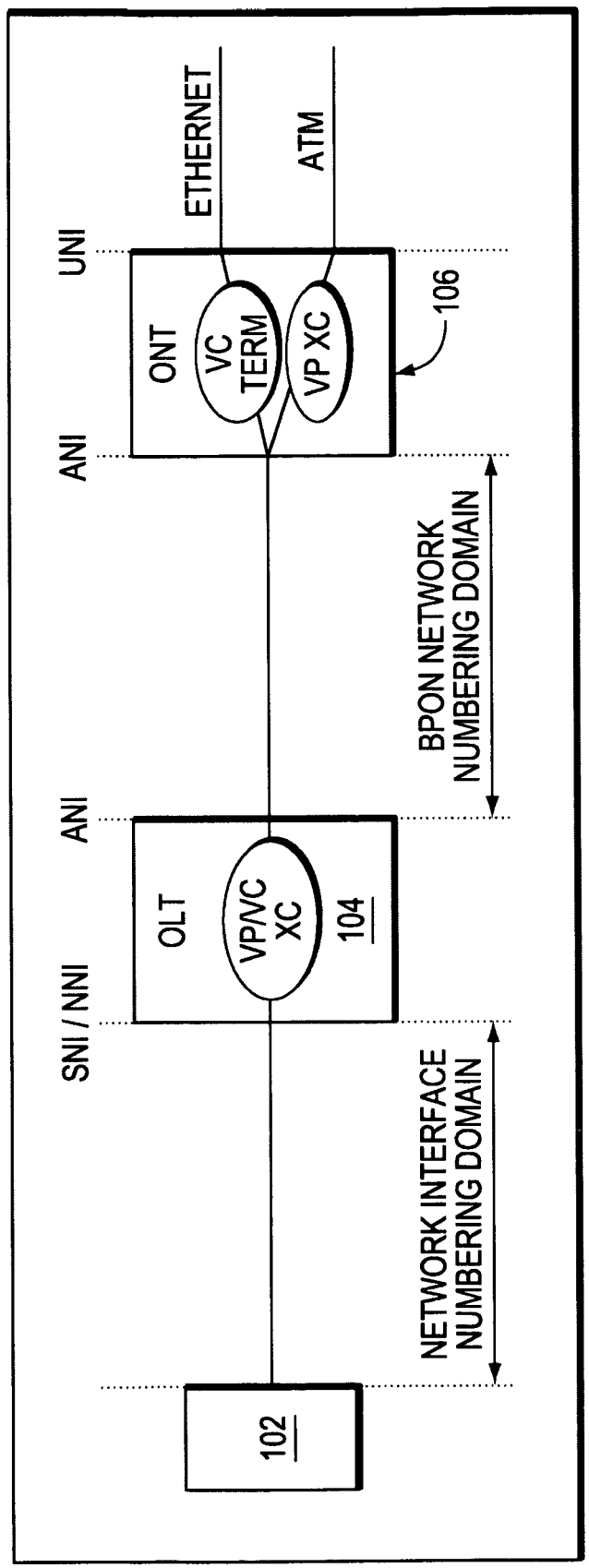
FIG. 1 is a block diagram of an example of a generalized PON network.

FIG. 1 shows a block diagram of an example of a PON network. A network interface separates the BPON network from a portion of a higher level network 102. The network interface may include, for example, an optical line termination (OLT) 104. The OLT may include, for example, hardware and/or software for providing virtual path, virtual circuit and cross connect functions. The OLT is further in communication with one or more optical network terminations (ONT) 106 or optical network units (ONU). As may be understood, the generic term "network termination" can be used in place of ONT, and the present invention is not restricted to use within an optical network, but may find an application in other types of network. The ONTs and/or ONUs each may include hardware and/or software for providing virtual circuit termination and virtual path cross connect functions, and may further include adaptation functions for interfacing with various other types of network interfaces such as Ethernet, for example. The network space between the OLT and ONTs can be referred to as the BPON network. Within the BPON network a system for numbering the virtual connections and virtual paths is used, thus the BPON numbering domain essentially includes that network space between the OLT and ONTs (or ONUs).

In at least one embodiment, the network is configured to provide communications in accordance with cell-switched communication standards and protocols such as, for example, ATM standards and protocols. In an embodiment, the network may provide Internet Protocol (IP)-based communications to support applications such as, but not limited to, Internet access. In particular, the network may be configured to provide IP over ATM using ATM Switched Virtual Connection (SVC) in accordance with Internet Engineering Task Force (IETF) Request for Comment (RFC) 1577, for example.

Embodiments of the present invention generally find an application within the BPON numbering domain. In order to automate the process of assigning identifying numbers to either or both of virtual circuits and virtual paths within the BPON network, embodiments of the present invention provide a method of selecting numbers from a preset group.

Within the preset group, each number can be said to correspond to both a particular type of communication and a particular port. In the context of virtual path identifying numbers, each identifying number includes a portion that corresponds to a particular port identification and another portion that corresponds to a particular type of service.

For example, in the context of VPIs, each port identification may correspond to a particular ONT within the network. In general, a single OLT may serve several ONTs, for example, up to 64 ONTs may be served by one OLT. In this case, six bits would be required to specify uniquely the port identification.

Each type of service identification may correspond to a particular type of service. For example, four possible types of service are UBR, CBR, nrt-VBR and rt-VBR. If only four types of service are required, then two further bits can define the type of service. However, it may be useful to employ three or more bits to define the type of service in order to allow for future developments and other services. The ATM standard allows for up to 12 bits total for defining VPIs and up to 16 bits for VCIs. As a result, in the above-described system for defining VPIs, there are at least three bits left unused. These extra bits could be used to provide additional information, or may be reserved for use with various future developments. The table shown in FIG. 2 summarizes an example of a numbering scheme in accordance with the above discussion.

Figure 2:
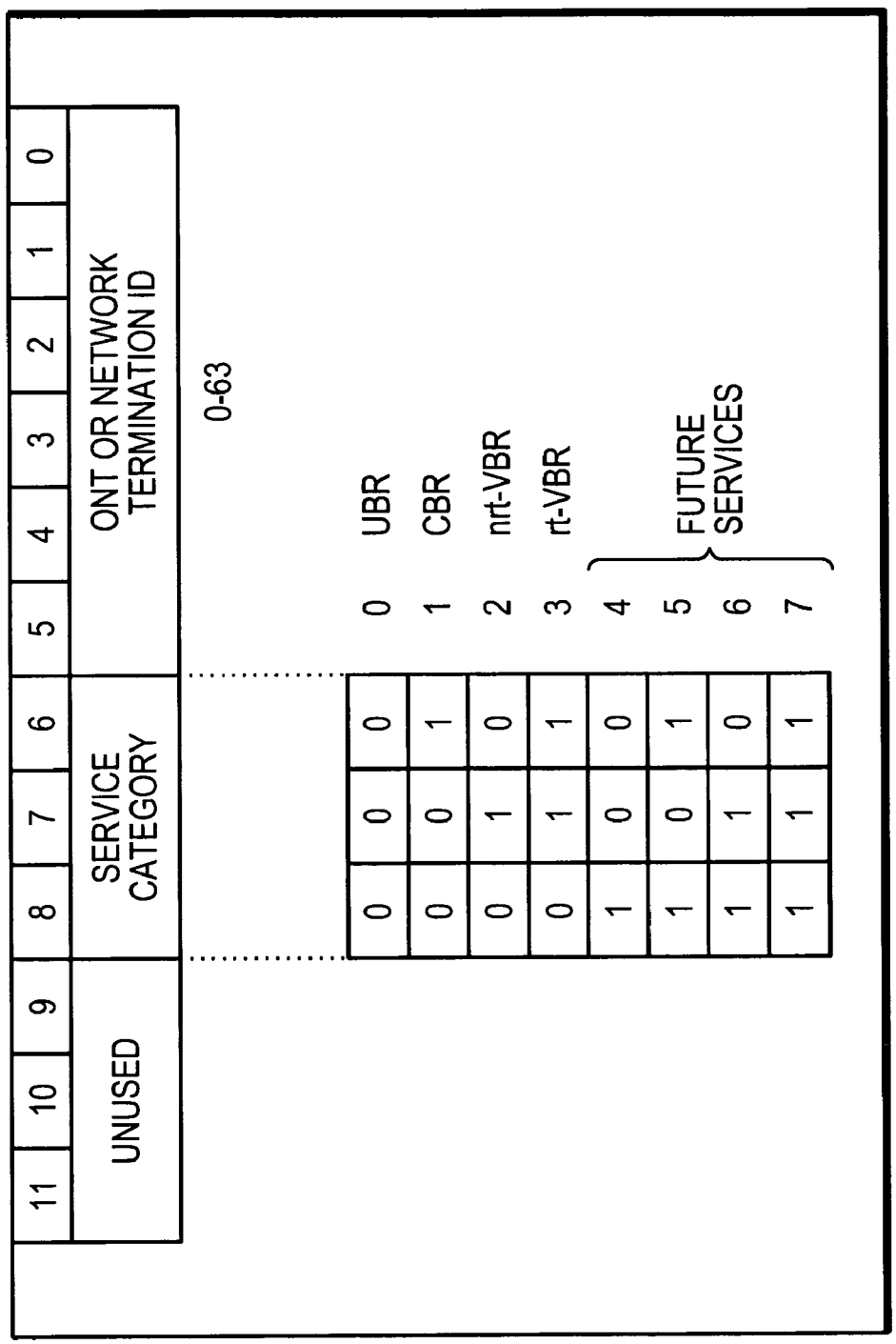
FIG. 2 shows a table summarizing an example of a numbering scheme.

As is clear from FIG. 2, up to 64 ONTs may be individually identified using the low six bits of the identification number. Further, three higher bits are used to define the category, or type, of communication. Type 0 corresponds to UBR, type 1 to CBR, type 2 to nrt-VBR and type 3 to rt-VBR.

The top three bits remain unused. If, for example, a single OLT were to communicate with more than 64 ONTs, more bits could be used on the low end to identify the ONTs, making use of some of the reserved bits. Likewise, if the number of types of services were to increase beyond 8, some of the reserved bits could be used to define those services. Another possibility for future use of the unused bits is a broadcast VPI that communicates with each of the ONTs. In general, such a broadcast VPI should be a non-churned VP.

By way of example, ONT #3, carrying nrt-VBR communication would be assigned identifying number 131. That is, because the type is voice CBR, the seventh bit is 1, corresponding to 128. The low bits are 000011, corresponding to 3, the number of the ONT. Thus, the VPI number is 131, which is simply 128 plus 3. As will be evident from the table in FIG. 2, for UBR type services the VPT number is always equal to the ONT number, as the high bits for UBR service are all zero.

Further examples are as follows: For ONT #15, UBR service, the VPI is 15; for ONT #10, CBR service: VPI=74; For ONT #1, CBR: VPI=65.

The table in FIG. 3 illustrates an example of another numbering scheme to be used for assigning numbers to VCIs. According to this table, the low bits encode the port number while the high bits encode the port type.

In the case of an ATM network, the ATM standard excludes the use of port numbers 0-32 for defining a VCI. As a result, the application of the table in FIG. 3 when applying that rule must make certain allowances and therefore results in some slightly different results than would the application of the table in FIG. 2. One such scheme is detailed in the table shown in FIG. 4.

Though the table of FIG. 4 provides specific examples of the number of ports for each type, such examples are not meant to be limiting. As may be seen, the table of FIG. 4 describes a situation in which multiple VCCs are provided for the data ports, but certain other functions receive only a single VCC assignment. For example, even though in the table of FIG. 4 particular channels are assigned fewer VCCs than other, they could instead be provided with the ability to make use of more, or indeed fewer VCCs. Additional types of circuits may be included, for example, specialized, proprietary data port types, video, additional types of voice circuits, diagnostic circuits, and the like.

As a further example, if data ports extended up to 32, rather than 24, as shown in the table of FIG. 4, the table would change only slightly and would simply make use of the numbers between 223 and 255 by changing the formulae in the fourth column. Likewise, any of the available numbers could be split differently from those splits shown in the table of FIG. 4. Furthermore, the unused bits allow for a far greater number of total VCIs and therefore ports than are shown in the table.

In order to further clarify the exemplary scheme illustrated in, some further examples are provided in which ordered pairs of the form {X,Y} are determined. Specifically, in each of the examples, X corresponds to a VPI number, while Y corresponds to a VCI number:

ONT #6, UBR service to Ethernet port, on $1^{st}$ VCC {6, 37}
ONT #6, UBR service to Ethernet port, on $2^{nd}$ VCC {6, 61}
ONT #6, CBR service to Ethernet port, on $1^{st}$ VCC {70, 37}
ONT #6, Single voice Circuit {70, 256}
ONT #2, OMCI CBR circuit {66, 512}
ONT #10, UBR circuit to $3^{rd}$ Ethernet port, on $1^{st}$ VCC {10, 34}

ONT #10, UBR circuit to 4$^{th}$ Ethernet port, on 1$^{st}$ VCC {10, 35}

ONT #8, T1 port #2 over CBR {72, 313}

While the invention has been described with reference to the certain illustrated embodiments, the words that have been used herein are words of description, rather than words of limitation. Changes may be made, within the purview of the associated claims, without departing from the scope and spirit of the invention in its aspects. Although the invention has been described herein with reference to particular structure, acts, and materials, the invention is not to be limited to the particulars disclosed, but rather can be embodied in a wide variety of forms, some of which may be quite different from those of the disclosed embodiments, and extends to all equivalent structures, acts, and, materials, such as are within the scope of the associated claims.

In particular, reference is made herein to ATM networks and to particular terms associated therewith. Nonetheless, the present invention may find use in other types of networks in which numbering schemes to identify particular paths or circuits may be employed.

What is claimed is:

1. A method of determining a communication identifier for use in a communication network, the method comprising:
    selecting an identifying number, for use as the communication identifier, that corresponds to a communication port and communication type, the identifying number being selected from a group of identifying numbers in which for each identifying number a first set of bits corresponds to a group of communication ports and a second set of bits corresponds to a group of communication types.

2. A method as in claim 1 wherein the communication network is any of an asynchronous transfer mode network, a broadband passive optical network, and a gigabit passive optical network.

3. A method as in claim 1 wherein selecting an identifying number includes selecting an identifying number having a group of low bits corresponding to the group of communication ports and a group of higher bits corresponding to the group of communication types.

4. A method as in claim 3 wherein selecting an identifying number includes selecting an identifying number for a virtual path interface or a virtual circuit interface where the group of low bits includes at least six bits and the group of higher bits includes at least three bits.

5. A method as in claim 1 wherein the group of communication ports corresponds to any of a plurality of optical network terminations, optical network units, virtual circuit connections, data ports, time-division multiplexing ports, and operations, administration, and maintenance ports.

6. A method as in claim 1 wherein the group of communication types includes any of unspecified bit rate, continuous bit rate, voice continuous bit rate, non-real time variable bit rate, and real time variable bit rate communications.

7. A method as in claim 1 wherein selecting an identifying number includes leaving at least some bits of the identifying number unused.

8. A method as in claim 1 wherein selecting an identifying number includes selecting an ordered pair corresponding to a virtual path identifier and a virtual circuit identifier.

9. A method as in claim 8 wherein selecting an ordered pair includes (i) selecting a first member of the ordered pair as being a number in which at least six low bits correspond to the group of communication ports and at least three higher bits correspond to the group of communication types, and (ii) selecting a second member of the ordered pair as being a number in which at least eight low bits correspond to another group of communication ports and at least three higher bits correspond to another group of communication types.

10. A method as in claim 1 wherein selecting the identifying number includes selecting the identifying number by reference to a look-up table.

11. A communications system comprising:
    a plurality of communication ports in a communication network allowing for a plurality of communication types;
    a processor configured to select an identifying number for use as a communication identifier that corresponds to one of the plurality of communication ports and one of the plurality of communication types; and
    a network controller configured to the identifying number as a communication identifier.

12. A system as in claim 11 wherein the processor selects the identifying number from a group of identifying numbers in which for each identifying number a first set of bits corresponds to the plurality of communication ports and a second set of bits corresponds to the plurality of communication types.

13. A system as in claim 11 wherein the communication network is any of an asynchronous transfer mode network, a broadband passive optical network, and a gigabit passive optical network.

14. A system as in claim 11 wherein the first set of bits are a group of low bits and the second set of bits are a group of higher bits.

15. A system as in claim 14 wherein the first set of bits includes at least six low bits and the second set of bits includes at least three higher bits, and wherein the identifying number is a number identifying a virtual path interface or a virtual circuit interface.

16. A system as in claim 11 further including any of a plurality of optical network terminations, optical network units, virtual circuit connections, data ports, time-division multiplexing ports, and operations, administration, and maintenance ports corresponding to the group of communication ports.

17. A system as in claim 11 wherein the group of communication types includes any of unspecified bit rate, continuous bit rate, voice continuous bit rate, non-real time variable bit rate, and real time variable bit rate communications.

18. A system as in claim 11 wherein the processor leaves at least some bits of the identifying number unused.

19. A system as in claim 11 wherein the communication identifier comprises an ordered pair corresponding to a virtual path identifier and a virtual circuit identifier.

20. A system as in claim 19 wherein a first member of the ordered pair includes a number in which at least six low bits correspond to a group of communication ports and at least three higher bits correspond to a group of communication types, and wherein a second member of the ordered pair includes a number in which at least eight low bits correspond to another group of communication ports and at least three higher bits correspond to another group of communication types.

21. A system as in claim 11 further including a look-up table used by the processor to select the identifying number.

22. A non-transitory computer readable medium having computer readable program codes embodied therein for determining a communication identifier for use in a communication network, the computer readable medium program codes including instructions that, when executed by a processor, cause the processor to:

select an identifying number, for use as the communication identifier, that corresponds to a communication port and communication type, the identifying number being selected from a group of identifying numbers in which for each identifying number a first set of bits corresponds to a group of communication ports and a second set of bits corresponds to a group of communication types.

* * * * *